United States Patent [19]

Suzuki et al.

[11] Patent Number: 5,019,162

[45] Date of Patent: May 28, 1991

[54] ACTIVATED CARBON FOR RECOVERY OF GOLD

[75] Inventors: Masayuki Suzuki, Soraku; Zenji Matsumoto, Izumi; Teruo Fukui, Nara, all of Japan

[73] Assignee: Takeda Chemical Industries, Ltd., Osaka, Japan

[21] Appl. No.: 493,148

[22] Filed: Mar. 14, 1990

[30] Foreign Application Priority Data

Mar. 14, 1989 [JP] Japan .................................. 1-062642
Jul. 21, 1989 [JP] Japan .................................. 1-190247

[51] Int. Cl.$^5$ ............................................... C01G 7/00
[52] U.S. Cl. .......................................... 75/744; 423/29
[58] Field of Search .............................. 75/744; 423/29

[56] References Cited

U.S. PATENT DOCUMENTS 4,289,532  9/1981  Matson .................................. 423/29
4,606,766  8/1986  Genik-Sas-Berezowsky ....... 75/744
4,734,270  3/1988  Touro .................................... 75/744

*Primary Examiner*—Peter D. Rosenberg
*Attorney, Agent, or Firm*—Wenderoth, Lind & Ponack

[57] ABSTRACT

There is disclosed an activated carbon for use in the process of recovery of gold which comprises adsorbing aurocyanide complexes thereon, desorbing the complexews therefrom and separating the activated carbon with a screen, the activated carbon being spherical and having a diameter of more than the opening of the screen but of not more than 2 mm; an iodine number of not less than 950 mg/g as determined by JIS K 1474-1975; and a hardness of not less than 99% as determined by JIS K 1474-1975.

Also disclosed is an improved, high efficient process of the recovery of gold which uses such a spherical activated carbon.

2 Claims, No Drawings

ACTIVATED CARBON FOR RECOVERY OF GOLD

This invention relates to activated carbon for recovery of gold from gold ores and a method for recovery of gold from gold ores using activated carbon.

For the recovery of gold from gold ores, the carbon-in-pulp process or CIP process has been practiced mainly in South Africa or Australia. The CIP process is described in detail, for example, in Minerals Sci. Engng., Vol. 12, No. 2, April, pp. 85-99, 1980, together with its historical background. The recovery of gold from carbonaceous gold-bearing ores is described in U.S. Pat. No. 4,188,208.

In the CIP process, a diluted alkali metal cyanide or an alkaline earth metal cyanide solution and an alkali are added to milled gold ores so that the gold content dissolves therein as a water soluble aurocyanide complex or $[Au(CN)_2]^-$, and then the resultant aqueous slurry or pulp which contains the ores and the complex are countercurrently brought into contact with activated carbon to adsorb the complex thereon. The thus loaded carbon is then separated from the pulp by filtration, and usually the loaded carbon is washed with hydrochloric acid to remove impurities and heavy metal components therefrom, followed by treatment with a hot cyanide solution to desorb the complex from the activated carbon.

The cyanide solution thus contains a concentrated amount of the gold. Usually an alkali and sodium sulfide are added to the solution to sediment silver sulfide and the sulfide is recovered, and thereafter the gold is recovered by electroextraction. After the desorption of the aurocyanide complex, the activated carbon is regenerated for reuse.

Heretofore crushed or cylindrical activated carbon has been used in the CIP process. As above set forth, the gold-loaded activated carbon is filtered by a screen, usually with one millimeter openings or slits one millimeter apart. However, such a crushed or cylindrical activated carbon is liable to clog the meshes of the screen, and necessitates frequent exchange of screens so as not to reduce efficiency of the recovery of gold.

Moreover, a conventional crushed or cylindrical activated carbon used in the CIP process is relatively susceptible to wet abrasion during the agitation with the pulp and transferring. Such wet abrased activated carbon can not be separated with a screen from the pulp, and this also reduces the efficiency of the recovery of gold.

As a further point to be noted, kinetic activity is considered more important than equilibrium loading or capacity because in practice carbons are never loaded with gold to more than about 10% of their capacity due to limited residence or contact time. However, as a further difficulty involved in the CIP process, a conventional activated carbon having a large adsorption velocity is inferior in abrasion strength, and as results, there have been no effective means to improve efficiency of the recovery of gold in the CIP process.

It is, therefore, an object of the invention to provide an activated carbon the use of which improves efficiency of the recovery of gold in the CIP process.

It is a further object of the invention to provide an improved CIP aprocess for the recovery of gold using a specific activated carbon as an adsorbent of gold in the pulp.

In accordance with the invention, there is provided an activated carbon for use in the process of recovery of gold which comprises adsorbing aurocyanide complexes thereon, desorbing the complexes therefrom and separating the activated carbon with a screen, the activated carbon being spherical and having a diameter of more than the opening of the screen but of not more than 2 mm; an iodine adsorption amount of not less than 950 mg/g as determined by JIS K 1474-1975; and a hardness of not less than 99% as determined by JIS K 1474-1975.

Further in accordance with the invention, there is provided an improvement in the process for the recovery of gold which comprises dissolving gold as aurocyanide complexes from milled gold ores into an aqueous solution containing an alkali metal cyanide or an alkaline earth metal cyanide and an alkali, bringing the resultant pulp into contact with an activated carbon to adsorb the complex thereon, separating the activated carbon with a screen, desorbing the complex from the activated carbon to recover the gold, and regenerating the activated carbon for reuse, the improvement which comprises the use of an activated carbon which is spherical and has a diameter of more than the opening of the screen but of not more than 2 mm; an iodine adsorption amount (or an iodine number) of not less than 950 mg/g as determined by JIS K 1474-1975; and a hardness of not less than 99% as determined by JIS K 1474-1975.

As herein before described, an activated carbon used in the CIP process first adsorbs aurocyanide complexes and is then separated by filtration from the pulp with a screen. According to the invention, the activated carbon used is spherical, and has a diameter of more than the opening of the screen used, but of not more than 2 mm. The spherical activated carbon makes point-contact with the meshes of the screen so that the screen is prevented from being clogged, contrary to conventional crushed or cylindrical activated carbons which make line-contact with the meshes. Since the screens used usually have an opening of 1 mm, the spherical activated carbon of the invention has usually a diameter of not less than 1 mm. As apparent, the larger the diameter of the activated carbon, the less frequently the screens are clogged, however, the less the adsorption activity of the carbon, so that it is provided that the activated carbon has a diameter of not more than 2 mm.

Further in accordance with the invention, the activated carbon has an iodine adsorption amount of not less than 950 mg/g-activated carbon as determined by JIS K 1474-1975 so that the carbon has a gold adsorption activity of at least 900 $hr^{-1}$. In general, the higher the degree of activation, the higher the gold adsorption activity of the carbon, but the smaller the mechanical strength, in particular, resistance to wet abrasion. From this standpoint of resistance to wet abrasion, an upper limit of the degree of activation is determined so that the activated carbon has a hardness of not less than 99% as determined by JIS K 1474-1975. This hardness ensures that the activated carbon has a resistance to wet abrasion of not less than 95%.

The recovery of gold in accordance with the invention may be carried out in the same manner as described in the before mentioned Minerals Sci. Engng., Vol. 12, No. 2, April, pp. 85-99, 1980 or U.S. Pat. No. 4,188,208, except that the spherical activated carbon as above specified is used as an adsorbent for the aurocyanide complexes in the CIP process.

More specifically, gold ores are milled to finely divided powders, and there are added thereto an aqueous solution of an alkali metal cyanide or an alkaline earth metal cyanide and an alkali to dissolve the gold thereinto as complexes. The resultant pulp is then countercurrently brought into contact with the activated carbon to adsorb the complex thereon, and the thus gold-loaded carbon is then separated from the pulp by filtration with a screen. The carbon is washed with an acid, preferably hydrochloric acid, and then treated with a hot cyanide solution to desorb the complexes from the activated carbon. The resultant cyanide solution in which the gold content is concentrated is subjected to electroextraction to recover the gold, while the activated carbon is regenerated for reuse.

In the above process, the cyanide used is preferably potassium or sodium cyanide and the alkali is preferably sodium hydroxide or calcium oxide.

The spherical activated carbon of the invention may be produced by a known process. For instance, carbonaceous raw materials such as lignite, bituminous coal or anthracite are powdered, admixed with other coal powders if desired. The powder is kneaded together with water and a binder such as pitch or sulfite pulp waste water, and then tumbling granulated into spherical bodies usually with a pelletizer. When needed, the granulated carbon is reformed by heat treatment at a relatively low temperature in the air or in an inert gas atmosphere, depending upon the carbonaceous material used, to prevent undesired hindrance of sintering or adhesion in the subsequent carbonization or activation steps.

The spherical carbon is then heated at a temperature usually of several hundreds to 800° C. in a rotary or vertical kiln in an inert atmosphere to fix the carbon, and is then put into contact with a reactive gas such as steam or carbon dioxide in a rotary, vertical or fluidized kiln to produce micropores on the carbon, thereby to produce spherical activated carbon.

The spherical activated carbon is classified so as to have a desired diameter for use in the CIP process in accordance with the invention.

The thus obtained spherical activated carbon may be used as it is to recover gold in the CIP process as set out before, however, the carbon may be washed with an inorganic acid and water after the activation, if necessary.

The invention will now be described in detail with reference to examples, however, the invention is not limited to the examples.

REFERENCE EXAMPLE

Bituminous coal was powdered with a hammer mill to a powder containing 83% of 200 mesh under. An amount of 100 parts by weight of the powder was mixed with 12 parts by weight of pulp waste water and 8 parts by weight of water, and the mixture was kneaded over 30 minutes with a batch type kneader. The kneaded mixture, while water was sprayed thereon as a binder, was granulated into spherical particles of 7-16 meshes and dried.

The particles were then placed in a rotary kiln of 150 mm in inside diameter and 250 mm in length. The kiln was rorated (1 rpm) and heated at a rate of 3.9° C. per minute from 250° C. to 600° C. while nitrogen was passed therethrough at a rate of 5 liters per minute, thereby to carbonize the particles.

An amount of 200 g of the resultant carbonized particles were placed in the same rotary kiln as above, and heated at 900° C. while steam was supplied thereinto at a rate of 5 g per minute, thereby to provide spherical activated carbons of varied degree of activation.

EXAMPLE 1

The spherical activated carbons of varied degree of activation thus prepared were classified to No. 1 to 4 carbons as shown in the Table 1. The bulk density, iodine number, hardness (JIS K 1474-1975), gold adsorption activity and resistance to wet abrasion of the carbons are shown in the Table 1. No. 1 carbon has a hardness of less than 99% and is for comparison.

GOLD ADSORPTION ACTIVITY

Activated carbon of the same diameter and an aqueous solution of aurocyanide complex were placed in a bottle, and the bottle was fixed on a roller. The roller was turned at a fixed rate and the gold concentration was determined at a fixed interval of time, and the gold adsorption activity of the activated carbon was determined. The experiment was carried out as follows.

In an aurocyanide solution of 500 ml containing 10 ppm of gold, 250 ppm of sodium cyanide and having a pH of 10 in a bottle, there were placed 0.5 g of activated carbon, and the bottle was turned at 100 rpm. The initial gold concentration and the concentration after 0.5, 1.0, 2.0 and 3.0 hours were determined by an atomic absorption method.

The dynamic data is directly obtained by plotting the gold concentration vs. time. Alternatively the dynamic activity coefficient is calculated based on the equation:

$$\log \Delta[Au]c^t/[Au]s^t = n \log t + \log k$$

wherein:
$\Delta[Au]c^t$ = change in carbon gold loading since time $t=0$;
$[Au]s^t$ = solution gold concentration at time t;
n = experimentally derived factor, $0.6 < n < 1.2$;
t = time in hours; and
k = rate constant.

RESISTANCE TO WET ABRASION

An amount of 2 liters of pulp and 30 g of an activated carbon were placed in a cylindrical vessel provided with impellers, and the mixture was agitated at 1000 rpm for 5 minutes. Then, the carbon was filtered with a screen with an opening of 1.00 mm, and the carbon on the screen was dried. An amount of 20 g of the carbon on the screen was again placed in the vessel, and the mixture was agitated for 20 minutes under the same conditions as above, thereby to wet abrade the carbon. The carbon in the mixture was again filtered with the same screen as above, and the carbon on the screen was dried. The resistance to wet abrasion (%) was determined by the rate of the amount of the carbon on the screen to the amount of the carbon used, namely (mass oversize (g)/20 (g))×100 (%).

The activated carbon used in the Comparative Example 2 in the Table 1 is a cylindrical activated carbon produced from peat, and is the same as currently used in the CIP process. This activated carbon has a low gold adsorption activity. The activated carbon used in the Comparative Example 3 is a crushed activated carbon produced from coconut shells, and is also the same as currently used in the CIP process. This activated carbon has a low hardness, and hence a low resistance to wet abrasion.

The activated carbons Nos. 1-4 are spherical activated carbons of 1.40-1.70 mm in diameter. However, No. 1 carbon is excessively activated, and as results, it has a low hardness and resistance to wet abrasion, although it has a very high gold adsorption activity. On the contrary, Nos. 2-4 carbons of the invention are superior both in gold adsorption activity and resistance to wet abrasion, and can be suitably used as high performance activated carbon in the CIP process.

TABLE 1

|  | No. of Activated Carbon | Particle Size (mm) | Bulk Density (g/l) | Properties of Activated Carbon ||||
| --- | --- | --- | --- | --- | --- | --- | --- |
|  |  |  |  | Iodine Number (mg/g) | Hardness (%) | Gold Adsorption ($hr^{-1}$) | Resistance to Wet Abrasion (%) |
| Comparative 1 | 1 | 1.40-1.70 | 480 | 1109 | 98.9 | 1446 | 93.0 |
| Example 1 | 2 | 1.40-1.70 | 525 | 1050 | 99.2 | 1485 | 96.0 |
| 2 | 3 | 1.40-1.70 | 595 | 1033 | 99.2 | 1258 | 96.3 |
| 3 | 4 | 1.40-1.70 | 625 | 971 | 99.3 | 954 | 96.5 |
| Comparative 2 | (a) | 1.40-1.70 | 510 | 1002 | 98.5 | 874 | 96.0 |
| 3 | (b) | 2.00-2.36 | 534 | 1107 | 98.0 | 882 | 92.5 |

Notes:
(a) Molded activated carbon of peat (cylindrical)
(b) Crushed activated carbon of coconut shells

EXAMPLE 2

No. 2 activated carbon in the Example 1 was sieved to provide spherical activated carbons of 1.55, 1.80, 2.00 and 2.18 mm in average diameter, respectively. Each carbon was then subjected to determination of gold adsorption activity and the results are given in the Table 2. It is illustrated therein that the carbon of more than 2.00 mm in diameter has a considerably low gold adsorption activity.

TABLE 2

|  | Activated Carbon ||
| --- | --- | --- |
| Carbon No. | Average Diameter (mm) | Gold Adsorption Activity ($hr^{-1}$) |
| 2 | 1.55 | 1480 |
| 2 | 1.80 | 1065 |
| 2 | 2.00 | 918 |
| 2 | 2.18 | 773 |

EXAMPLE 3

No. 3 carbon in the Example 1 was regenerated and then examined how it deteriorated. The results are given in the Table 3.

A fresh activated carbon of the invention was put into contact with a waste pulp to forcibly deteriorate so that it had a gold adsorption activity of 475 $hr^{-1}$. This carbon was then regenerated by heating at 650° C. for 30 minutes in a rotary kiln while steam was supplied thereinto. As the results are shown in the Table 3, the carbon of the invention is suffered from no deterioration in gold adsorption activity and resistance to wet abrasion.

TABLE 3

|  | Activated Carbon ||
| --- | --- | --- |
| Carbon No. | Treatment | Gold Adsorption Activity ($hr^{-1}$) | Resistance to Wet Abrasion (%) |
| 3 | (Fresh) | 1270 | 96.3 |
| 3 | Deteriorated | 745 | — |
| 3 | Regenerated | 1350 | 96.3 |

What is claimed is:

1. An activated carbon for use in the process of recovery of gold which comprises adsorbing aurocyanide complexes thereon, desorbing the complexes therefrom and separating the activated carbon with a screen, the activated carbon being spherical and having a diameter of more than the opening of the screen but of not more than 2 mm; an iodine number of not less than 950 mg/g as determined by JIS K 1474-1975; and a hardness of not less than 99% as determined by JIS K 1474-1975.

2. The activated carbon as claimed in claim 1 for use in the process of recovery of gold wherein the screen has openings of 1 mm and the carbon has a diameter of more than 1 mm.

* * * * *